(12) United States Patent
Kauper et al.

(10) Patent No.: US 11,707,791 B2
(45) Date of Patent: Jul. 25, 2023

(54) DRILL AND METHOD FOR PRODUCING A DRILL

(71) Applicant: Kennametal Inc., Latrobe, PA (US)

(72) Inventors: Herbert Rudolf Kauper, Rosstal (DE); Christian Strauchmann, Eggolsheim (DE); Jürgen Schwägerl, Vohenstrauss (DE)

(73) Assignee: KENNAMETAL INC., Latrobe, PA (US)

( * ) Notice: Subject to any disclaimer, the term of this patent is extended or adjusted under 35 U.S.C. 154(b) by 95 days.

(21) Appl. No.: 16/987,683

(22) Filed: Aug. 7, 2020

(65) Prior Publication Data

US 2021/0039176 A1 Feb. 11, 2021

(30) Foreign Application Priority Data

Aug. 7, 2019 (DE) .......................... 102019211827.5

(51) Int. Cl.
*B23B 51/02* (2006.01)

(52) U.S. Cl.
CPC ........ *B23B 51/02* (2013.01); *B23B 2251/122* (2013.01); *B23B 2251/14* (2013.01); *B23B 2251/201* (2013.01); *B23B 2251/44* (2013.01); *B23B 2251/446* (2013.01)

(58) Field of Classification Search
CPC ......... B23B 51/02; B23B 51/14; B23B 51/44; B23B 51/446; B23B 2251/201; B23B 2251/122; B23B 2251/14; B23B 2251/44; B23B 2251/446
See application file for complete search history.

(56) References Cited

U.S. PATENT DOCUMENTS

| | | | |
|---|---|---|---|
| 5,486,075 A | 1/1996 | Nakamura et al. | |
| 6,309,149 B1* | 10/2001 | Borschert | B23B 51/02 408/1 R |
| 6,988,859 B2* | 1/2006 | Borschert | B24B 3/26 451/48 |
| 9,656,327 B2* | 5/2017 | Nomura | B23B 51/0054 |
| 10,947,788 B2* | 3/2021 | Domani | B28D 1/146 |

(Continued)

FOREIGN PATENT DOCUMENTS

| | | | |
|---|---|---|---|
| CN | 107414149 A | * 12/2017 | |
| DE | 102010027203 A1 | * 1/2012 | B23B 51/02 |

(Continued)

OTHER PUBLICATIONS

Machine Translation, Description DE102010027203A1. (Year: 2012).*

(Continued)

*Primary Examiner* — Eric A. Gates
*Assistant Examiner* — Reinaldo A Vargas Del Rio
(74) *Attorney, Agent, or Firm* — Larry R. Meenan

(57) ABSTRACT

The invention relates to a drill comprising a body which extends along a longitudinal axis (L) from a rear side (B) to a front side (F), wherein the body comprises a main cutting edge on the front side (F), wherein the body comprises at least one guide bevel which extends in axial direction (A) and toward the front side (F), wherein, toward the front side (F), the guide bevel has an end section which is tapered. The invention further relates to a method for producing such a drill.

7 Claims, 5 Drawing Sheets

(56) References Cited

U.S. PATENT DOCUMENTS

| | | | |
|---|---|---|---|
| 2003/0017015 A1* | 1/2003 | Strubler | B23D 77/00 |
| | | | 408/230 |
| 2003/0053873 A1 | 3/2003 | Shaffer | |
| 2003/0188895 A1 | 10/2003 | Osawa | |
| 2012/0114440 A1 | 5/2012 | Kress | |
| 2014/0294529 A1 | 10/2014 | Takai | |
| 2015/0375356 A1 | 12/2015 | Jaeger | |
| 2018/0043441 A1* | 2/2018 | Fujiwara | B23B 51/02 |
| 2020/0398350 A1* | 12/2020 | Fujiwara | B23B 51/02 |

FOREIGN PATENT DOCUMENTS

| | | | | |
|---|---|---|---|---|
| DE | 102015014876 A1 * | 5/2017 | | B23B 51/009 |
| DE | 102016221363 | 3/2018 | | |
| DE | 10 2019 211 827 A1 | 2/2021 | | |
| EP | 3436211 B1 * | 3/2021 | | B23D 77/00 |
| JP | 2012061586 A * | 3/2012 | | |
| WO | WO2018215464 | 11/2018 | | |

OTHER PUBLICATIONS

Apr. 27, 2020 Office Action (non-US) DE App. No. 102019211827. 5.

English translation—"Bei EMUGE gefertigter Artikel hergestellt 2018", Anlage MB1, Meissner Bolte, Emuge Franken, dated Feb. 1, 2019.

English translation—"Gratminimales Bohren mit VHM-Bohrerkonzepten-ein Werkzeugbenchmark" by Adrian Meinhard and Sebastian Guth, Anlage MB2, Meissner Bolte, dated Dec. 4, 2017.

"Bei EMUGE gefertigter Artikel hergestellt 2018", Anlage MB1, Meissner Bolte, Emuge Franken, dated Feb. 1, 2019.

"Gratminimales Bohren mit VHM-Bohrerkonzepten-ein Werkzeugbenchmark" by Adrian Meinhard and Sebastian Guth, Anlage MB2, Meissner Bolte, dated Dec. 4, 2017.

MAPAL Catalogues—Drilling, Boring, Countersinking, https://mapal.com/en-int/media/catalogues/catalogues-drilling, pp. 191-210.

* cited by examiner

DRILL AND METHOD FOR PRODUCING A DRILL

RELATED APPLICATION DATA

The present application claims priority pursuant to 35 U.S.C. § 119(a) to German Patent Application Number 102019211827.5 filed Aug. 7, 2019 which is incorporated herein by reference in its entirety.

FIELD

The invention relates to a drill and a method for producing a drill.

BACKGROUND

Drills are rotary tools and are used for machining a workpiece. When drilling a bore in the workpiece using the drill, the drill is subjected to high loads. The so-called cutting corner, which is located at the transition from a main cutting edge on the front side of the drill to a lateral guide bevel, is particularly affected. The cutting corner and the guide bevel in this area wear down over time, which, in unfavorable cases, further increases the load, so that the wear and also the risk of parts of the drill breaking off escalates.

SUMMARY

With this in mind, the object of the invention is to provide an improved drill. This drill should in particular exhibit reduced wear and should also, in particular even in the case of progressive wear, allow the best possible machining of a workpiece. A method for producing such a drill is to be provided as well.

The object is achieved according to the invention by a drill having the features according to claim 1. Advantageous configurations, further developments, and variants are the subject matter of the subclaims. The statements made in connection with the drill apply analogously to the method and vice versa.

In general, the drill is used for machining a workpiece, in particular for drilling a bore in a workpiece. The drill comprises an in particular elongated body, which extends along a longitudinal axis from a rear side to a front side. On the rear side, the drill in particular comprises a shaft for mounting in a tool mount. On the front side, the drill comprises a tool tip for machining the workpiece. On the front side, the body comprises a main cutting edge, which is in particular part of the tool tip and which engages on the workpiece during operation.

The body further comprises at least one guide bevel, which extends in axial direction and toward the front side. The axial direction is parallel to the longitudinal axis. The guide bevel is preferably spiral-shaped and then extends helically around the longitudinal axis. A straight guide bevel is conceivable as well, however, and also suitable. The guide bevel is disposed on a lateral outer surface of the drill and is used to guide the drill in the bore during operation. For this purpose, the guide bevel lies against and extends along an inner wall of the bore, which results in a corresponding mechanical stress. The guide bevel is thus in particular the part of the body that, during operation, is in contact with the inner wall of the bore in radial direction, i.e. laterally. The rest of the body of the drill, and specifically its outer surface, is set back in radial direction, i.e. perpendicular to the longitudinal axis, in relation to the guide bevel. In other words, the guide bevel protrudes in radial direction with respect to the outer surface. The guide bevel thus determines a maximum diameter of the drill, which otherwise, i.e. along the outer surface, then has a smaller diameter. Viewed in the direction of rotation, the guide bevel preferably precedes the outer surface. The guide bevel thereby in particular separates the outer surface from a flute in the body. Also conceivable and equally suitable are configurations in which the guide bevel follows the outer surface or divides said surface into multiple partial outer surfaces in the direction of rotation. The guide bevel further in particular comprises a so-called secondary cutting edge, which precedes in the direction of rotation and thus forms a leading edge of the guide bevel.

In the present case, the guide bevel has an end section toward the front side, which is tapered. In other words: The guide bevel extends toward the front side and, in the direction to the front side, ends in an end section which is tapered in relation to the rest of the guide bevel. The end section forms an end of the guide bevel. The guide bevel thus has a reduced bevel width at the end toward the front side. The bevel width of the guide bevel is preferably measured perpendicular to the guide bevel.

One advantage of the invention is in particular that the drill wears less due to the guide bevel being tapered at the end. This is in particular based on the observation that the guide bevel, which precedes in the direction of rotation, is particularly heavily stressed and therefore initially wears predominantly in the region of the secondary cutting edge and the cutting corner. As soon as these leading sections are at least partially worn off, the sections of the guide bevel behind them are correspondingly stressed by pressure and friction and wear down as well, as a result of which there is still the danger that parts of the body can come loose or be knocked off. One basic idea of the invention is therefore in particular to omit or reduce these trailing sections or parts of the guide bevel from the outset, so that they are not stressed by pressure and friction when the guide bevel starts to wear and then further impair the operation of the drill. As a result, optimum machining of the workpiece remains possible over a remarkably long period of time. The service life of the drill is moreover advantageously extended as well.

A guide bevel with a tapered end section is particularly useful for a drill having a body which tapers toward the rear side, i.e. which has a so-called "taper". Such a body is usually slightly cone-shaped, so that its diameter on the front side is 1% to 5% larger, for example, and the guide bevel is therefore also particularly heavily stressed at the front. However, a tapered end section is furthermore also generally advantageous for other drills.

The end section is preferably tapered by the formation of a free surface on the side of the body along the guide bevel. The body therefore has a free surface, which is disposed laterally and in particular replaces a part of the guide bevel so that it is narrower toward its end. The free surface thus replaces a part of the guide bevel and is set back in radial direction in relation to said guide bevel. On the end section, the free surface and the guide bevel extend directly next to one another in axial direction, i.e. they are directly adjacent to one another. The free surface distinguishes itself from the guide bevel in that the drill has a smaller diameter on the free surface. In operation, in particular only the guide bevel is in contact with the inner wall of the bore, but not the free surface. In this way, the contact surface of the drill to the bore along the end section is reduced compared to a guide bevel with a non-tapered end section.

The free surface is thus similar to the outer surface, which is likewise set back in radial direction relative to the guide bevel. However, at least on the side of the body, the free surface is in particular significantly smaller than the outer surface. The free surface is separate from the outer surface and is not a part of said outer surface, but the free surface preferably adjoins the outer surface. Whereas the outer surface typically extends along the entire guide bevel, the free surface extends in axial direction only along a part of the guide bevel, namely along the end section, and therefore does not reach the rear side of the drill. The outer surface is furthermore typically configured with an in particular constant radius, whereas the free surface does not necessarily have a constant radius, but rather preferably deviates from that. In addition, the free surface protrudes in radial direction in particular relative to the outer surface and is therefore located between the guide bevel and the outer surface with respect to the radius.

A configuration in which the free surface follows the end section in the direction of rotation of the drill, in particular follows directly, is particularly preferred. The guide bevel, and specifically in particular its secondary cutting edge, thus precede the free surface, so that the end section, which follows in the direction of rotation, transitions into the free surface which then slopes away in radial direction and thus results in a reduced diameter of the body behind the guide bevel. Lastly, following in the direction of rotation, the outer surface then adjoins the free surface. In one configuration, a step is formed between the free surface and the outer surface. In contrast, in another configuration, the free surface transitions to the outer surface without edges. All in all, viewed in the direction of rotation, there is an arrangement of the guide bevel, specifically its end section, the free surface and lastly the outer surface, one behind the other.

The free surface preferably transitions into the guide bevel without steps, i.e., in particular without edges. The free surface thus represents a surface that slopes away from the guide bevel, in particular in the direction of the outer surface. There is then no step or edge at the transition between the guide bevel and the free surface; instead the transition as a whole is continuous and rounded.

In one advantageous configuration, the free surface comprises two partial surfaces, namely an axial surface which extends on the side of the body along the end section, i.e. predominantly in axial direction, and a radial surface which extends on the front side, i.e. predominantly in radial direction, such that the free surface as a whole is curved, namely in particular from one side of the body toward the front side. This results in a further difference between the outer surface and the free surface, such that the outer surface extends in axial direction only up to a circumferential edge, thus ending at the tool tip, whereas the free surface is inserted into the tool tip from the side of the body and beyond the circumferential edge. The two partial surfaces are preferably both configured without edges and expediently also transition into one another without edges, so that the free surface is a curved surface that is entirely without edges. The tapered end section is formed on the side of the body by the axial surface. The radial surface, on the other hand, is disposed on the front side, generally points in axial direction, and forms a part of the tool tip. In one suitable configuration, the free surface initially follows a generally conical shape of the tool tip and, viewed from a center of the drill, then slopes away in radial direction outward in a curved manner. In the curved transition from the radial surface to the axial surface, the free surface in particular has a radius of curvature that is preferably between 5% and 20% of a diameter of the drill, i.e. the drill diameter.

The radial surface preferably extends along the main cutting edge and follows said edge in the direction of rotation. The free surface, more precisely its radial surface, is directly adjacent to the main cutting edge and thus also determines a clearance angle of the main cutting edge. The free surface extends in radial direction outward, in particular to an outer end of the main cutting edge. In one suitable configuration, the free surface is a first free surface that extends inward only along an outer part of the main cutting edge and to the inside adjoins a second free surface, which extends along an inner part of the main cutting edge and into the center. The second free surface is in particular larger than the first free surface. The first free surface is also referred to as the outer free surface, whereas the second free surface is referred to as the inner free surface. The first and the second free surface together are also regarded as a single free surface; specifically in a preferred configuration in which the transition between the first and the second free surface is continuous. To the inside, the free surface then extends to an inner end of the main cutting edge. In one suitable configuration, the inner end of the main cutting edge adjoins a chisel edge, which extends in the center of the drill and is formed by a point thinning. Like the free surface, the point thinning is a forward-facing surface on the front side. To the inside, the point thinning preferably adjoins the free surface, in particular directly.

The main cutting edge and the guide bevel, more specifically their end section, suitably end together in a cutting corner that is adjoined by the free surface which follows in the direction of rotation. The cutting corner thus in particular forms a respective end point for the main cutting edge and the secondary cutting edge. As a matter of principle, an imaginary boundary line between the guide bevel and the free surface also ends in the cutting corner. Overall, due to the tapered configuration, the guide bevel tapers in the direction toward the cutting corner and ends there. The cutting corner itself is entirely surrounded by the guide bevel, the free surface which follows the cutting corner, and also in particular by a flute. The flute generally in particular adjoins the main cutting edge and thus determines a rake angle of said main cutting edge. In radial direction, the flute is preferably delimited by the guide bevel, specifically by the secondary cutting edge.

The free surface is preferably configured entirely without edges, in particular in the configuration with an axial surface and a radial surface. A configuration is generally conceivable, in which the outer surface and the radial surface, i.e. a free surface that follows the main cutting edge, are separated by a circumferential edge that extends in the direction of rotation around the longitudinal axis and ends in the cutting corner. Due to the specific free surface, in which the axial surface at least transitions into the radial surface without edges or which is even configured entirely without edges, the circumferential edge ends prematurely and does not reach the cutting corner. In fact, the free surface separates the cutting corner from an end of the circumferential edge and lies in between, so that a rounded and edge-free transition from the front side to the side of the body is realized in the direction of rotation behind the cutting corner. The free surface can thus advantageously be produced in a single pass and in a single process step, and is preferably also produced in this manner. Proceeding from a semi-finished product having a circumferential edge that extends to the cutting corner, the circumferential edge directly behind the cutting corner is rounded by the free surface and, as a result, in one suitable configuration, the cutting corner is moved as well.

The guide bevel generally has a bevel width which, in the present case, varies due to the tapered end section along the guide bevel, i.e. is smaller on the end section. In a particularly useful configuration, the bevel width outside the end section corresponds to a normal width and, along the end section, the free surface has a width that together with the bevel width of the end section corresponds to the normal width. Taken together, the free surface and the end section are thus just as wide as the rest of the guide bevel. The bevel width is preferably constant along the guide bevel outside the end section, so that the guide bevel has the normal width throughout, at least to the end section, and the bevel width then deviates from the normal width only along the end section. The difference to the normal width is filled in by the free surface.

Viewed from the side, the guide bevel is in particular strip-shaped, the end section in itself is strip-shaped as well, and likewise preferably also the free surface along the end section. More specifically, the free surface and the end section are approximately needle-shaped or funnel-shaped with a tapered section that is followed by a straight section of constant width, which is then in turn followed by a further tapered section that preferably ends in a point. The free surface, specifically its axial surface, and the end section extend parallel to one another, so to speak, at least along the straight sections, so that the free surface and the guide bevel quasi intertwine when viewed from the side. In other words: an imaginary dividing line between the end section and the free surface extends parallel to the guide bevel, i.e. in the direction of said guide bevel. The width of the free surface along the end section is in particular constant or decreasing in the direction toward the rear side, but not increasing. Conversely, the bevel width along the end section in the direction toward the front side is likewise in particular constant or decreasing. There is therefore no renewed widening in the direction of the respective end. Instead, the width of the free surface and the bevel width preferably decrease monotonically toward the respective end. The described parallel course of the end section and the free surface is not mandatory and, in a suitable variant, an imaginary dividing line between the end section and the free surface does not extend parallel to the guide bevel as described above, but rather at an angle to it.

In one useful configuration, the free surface has a width along the end section that is between 20% and 60% of a bevel width of the guide bevel along the end section. The width and the bevel width are in particular measured on a respective straight section as described above. Particularly preferred is a width of 30% to 50% of the bevel width of the end section. The absolute width and the absolute bevel width depend on the specific configuration and dimensioning of the drill. Only as an example, the normal width in one configuration is 2 mm, the bevel width then tapers toward the end section to 1.3 mm, for example, before the guide bevel tapers further to the cutting corner. Correspondingly, the width of the free surface is then 0.7 mm.

In principle, it is possible and also suitable to form the free surface over the entire length of the guide bevel such that the end section corresponds to the overall guide bevel. However, a configuration is preferred, in which the end section is shorter than the overall guide bevel, i.e. only forms a part of said guide bevel. In one suitable configuration, the end section has a length that corresponds to 4% to 40% of a diameter of the drill, whereby the length and the total length are measured along the guide bevel. In the case of a drill with a 20 mm diameter, for example, the end section is then 0.8 mm to 8 mm long. However, the specific lengths depend on the actual dimensioning of the drill.

To produce the drill, the end section is tapered by grinding the end of the guide bevel. This is in particular done using a grinding wheel.

Particularly preferred is a configuration, in which the end section is tapered by grinding off a part of the guide bevel by grinding in a free surface which extends continuously from the front side of the body to a side of the body. Proceeding from a semi-finished product having a guide bevel with an in particular continuously constant bevel width, the end of the guide bevel is partially removed and, as a result, the free surface is formed. The free surface is preferably formed when grinding in an end face geometry of the drill, i.e. when grinding in the tool tip. The free surface is then expediently continued from the main cutting edge along the side of the body by inserting the grinding wheel into the outer surface and the guide bevel, in particular in one step around the circumferential edge, or vice versa.

BRIEF DESCRIPTION OF THE DRAWINGS

Design examples of the invention are explained in more detail in the following with the aid of a drawing. The figures show, in each case schematically.

DETAILED DESCRIPTION

Figure 7:
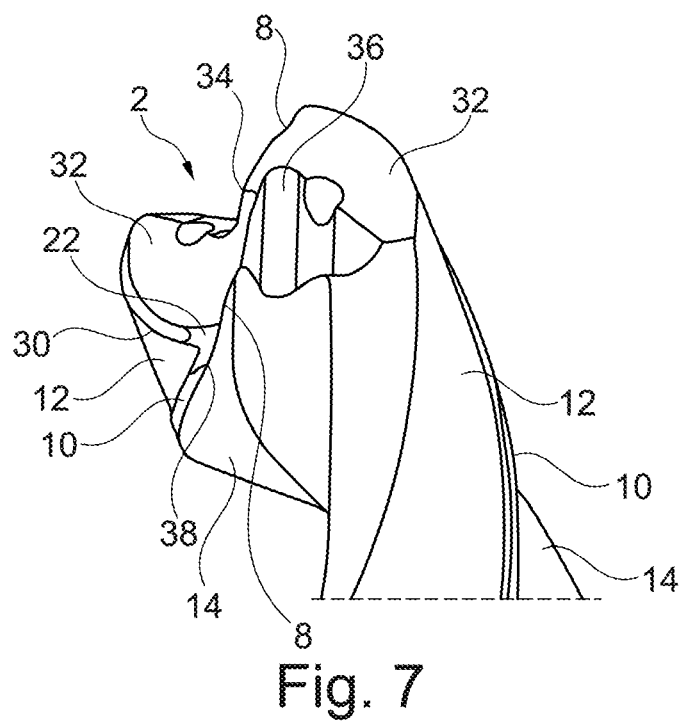
Figure 8:
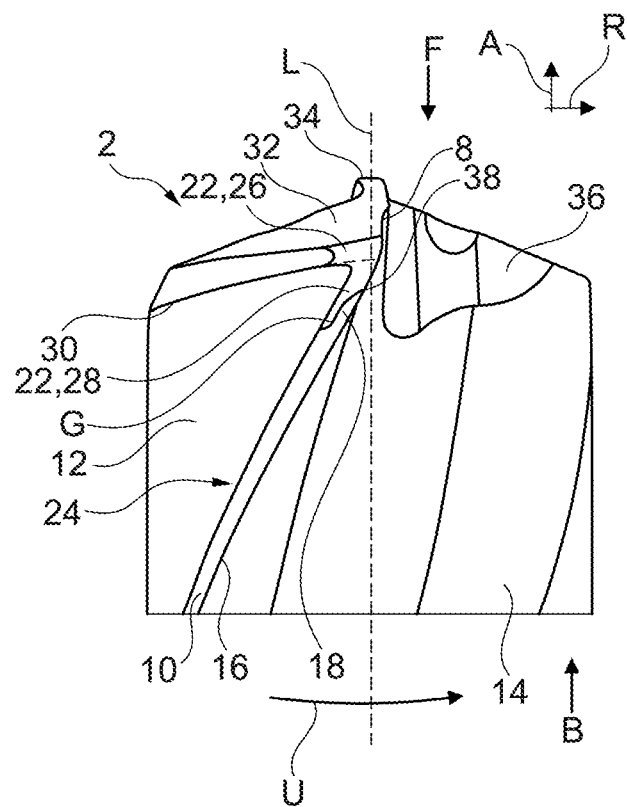
Figure 9:
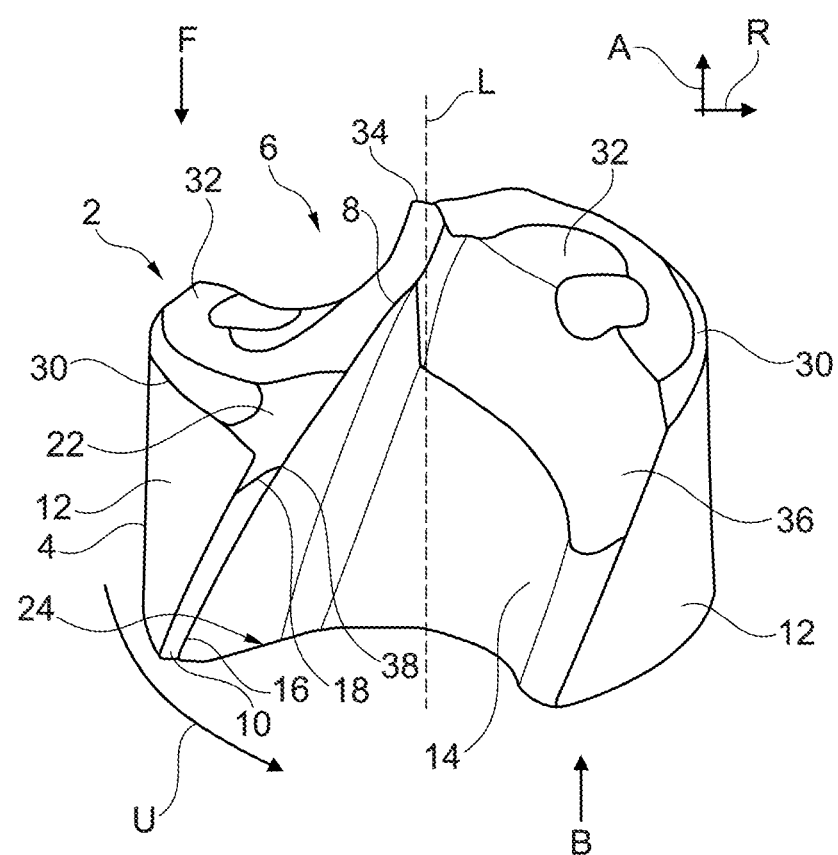

FIGS. 1 to 6 show sections of a first design example of the invention in different views. Each one shows a drill 2, which is used overall for drilling a bore into a not depicted workpiece. The drill 2 comprises an elongated body 4, which extends along a longitudinal axis L from a rear side B to a front side F. On the rear side B, the drill 2 comprises a not depicted shaft for mounting in a tool mount. On the front side F, the drill 2 comprises a tool tip 6 and the body 4 further comprises at least one, in this case two, main cutting edges 8 that are part of the tool tip 6. In FIGS. 7 and 8, the drill 2 of FIGS. 1 to 6 is shown with additional coolant channels that are not described in greater detail. FIG. 9 shows a further variant of the drill 2 in a perspective view.

The body 4 further comprises at least one guide bevel 10, which extends in axial direction A and toward the front side F, wherein the axial direction A extends parallel to the longitudinal axis L, i.e. in longitudinal direction. In the design examples shown, the guide bevel 10 is spiral-shaped and extends helically around the longitudinal axis L. The guide bevel 10 is disposed on a lateral outer surface 12 of the drill 2 and is used to guide the drill 2 in the bore during operation and is thus the part of the body 4 that, during operation, is in contact with the inner wall of the bore in radial direction R, i.e. laterally and perpendicular to the longitudinal axis L. The rest of the body 4 of the drill 2, and specifically its outer surface 12, is set back in radial direction R relative to the guide bevel 10, as can be seen, for example, in FIG. 1.

In the design examples shown, the guide bevel 10 precedes the outer surface 12 when viewed in the direction of rotation U of the drill 2. The guide bevel 10 thereby separates the outer surface 12 from a flute 14 in the body 4. Also conceivable and equally suitable are not depicted configurations, in which the guide bevel 10 follows the outer surface 12 or divides said surface into multiple partial outer surfaces in the direction of rotation U.

The guide bevel 10 further also comprises a so-called secondary cutting edge 16, which precedes in the direction of rotation U and thus forms a leading edge of the guide bevel 10.

In the present case, the guide bevel 10 has an end section 18 toward the front side F, which is tapered. In other words: The guide bevel 10 extends toward the front side F and, in this direction, ends in an end section 18 which is tapered in relation to the rest of the guide bevel 10. The end section 18 forms an end of the guide bevel 10, so that it has a reduced bevel width 20 on the end and toward the front side F, wherein the bevel width 20 is measured perpendicular to guide bevel 10. Such a guide bevel 10 with a tapered end section 18 is particularly useful for a drill 2 having a body 4 which tapers toward the rear side R, i.e. which has a so-called "taper", as can be seen in the drill 2 in FIG. 5, for example. Such a body 4 is usually slightly cone-shaped, so that its diameter on the front side F is 1% to 5% larger, for example. However, a tapered end section 18 is furthermore also advantageous for other drills 2.

In the present case, the end section 18 is tapered as a result of the formation of a free surface 22 on the side of the body 4 along the guide bevel 10. Said free surface is disposed on the side of the body 4 and replaces a part of the guide bevel 10, so that it is narrower toward its end. This can be seen particularly clearly in FIGS. 1, 3, 5 and 8. The free surface 22 is set back in radial direction R in relation to the guide bevel 10. On the end section 18, the free surface 22 and the guide bevel 10 extend directly next to one another in axial direction A and are thus directly adjacent to one another. The free surface 22 now distinguishes itself from the guide bevel 10 in that the drill 2 has a smaller diameter D on the free surface 22. During operation, only the guide bevel 10 is in contact with the inner wall of the bore, but not the free surface 22, so that the contact surface of the drill 2 to the bore along the end section 18 is reduced.

The free surface 22 is similar to the outer surface 12, in that the free surface 22 is likewise set back in radial direction R relative to the guide bevel 10. At least on the side of the body 4, however, the free surface 22 is significantly smaller than the outer surface 12. The free surface 22 is also separate from the outer surface 12 and is not a part of said outer surface, but it does adjoin the outer surface 12. Whereas the outer surface 12 typically extends along the entire guide bevel 10, the free surface 22 extends in axial direction A only along the end section 18, and therefore does not reach the rear side B of the drill 2. The outer surface 12 is furthermore typically configured with a constant radius, whereas the free surface 22 does not necessarily have a constant radius, but rather deviates from that. In addition, the free surface 22 protrudes in radial direction R relative to the outer surface 12 and is therefore located between the guide bevel 10 and the outer surface 12 with respect to the radius.

In the design examples shown, the free surface 22 directly follows the end section 18 in the direction of rotation U. The guide bevel 10 and its secondary cutting edge 16, thus precede the free surface 22, so that the end section 18, which follows in the direction of rotation U, transitions into the free surface 22 which then slopes away in radial direction R and thus results in a reduced diameter D of the body 4 behind the guide bevel 10. Lastly, following in the direction of rotation U, the outer surface 12 then adjoins the free surface 22. In the two configurations shown, a step 24 is formed between the free surface 22 and the outer surface 12; in another not depicted configuration, in contrast, the free surface 22 transitions to the outer surface 12 without edges. In the design examples shown, the free surface 22 transitions into the guide bevel 10 without steps, i.e. without edges, as well. There is then no step or edge at the transition between the guide bevel 10 and the free surface 22; instead the transition as a whole is continuous and rounded.

Figure 1:
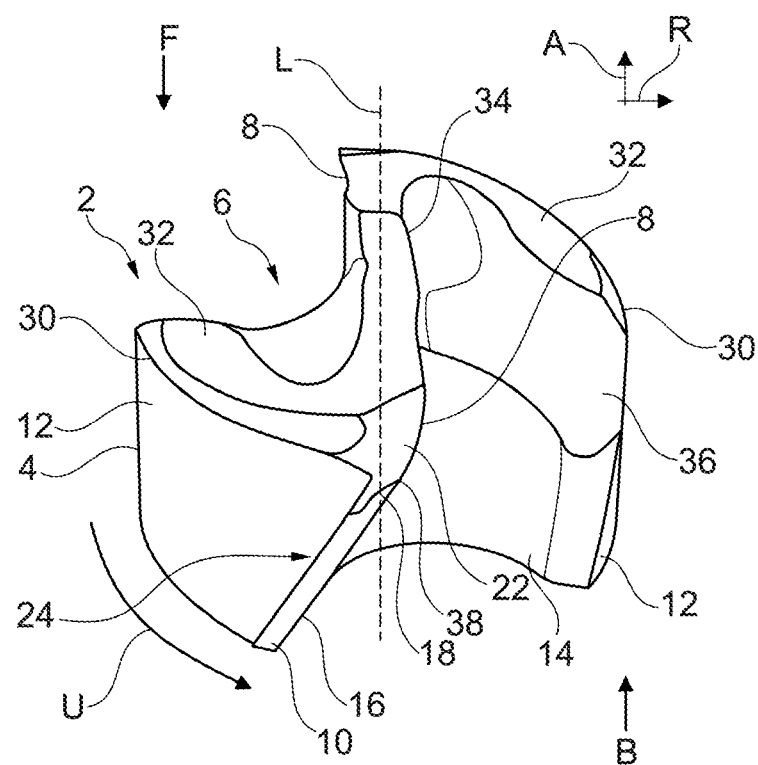
FIG. 1 a drill in a perspective view,
FIG. 2 the drill of FIG. 1 in a front view,
FIG. 3 a section of the drill of FIG. 1 in a detail view,
FIG. 4 the drill of FIG. 1 in a different perspective view,
FIG. 5 the drill of FIG. 1 in a lateral view,
FIG. 6 the drill of FIG. 1 in a different lateral view,
FIG. 7 a variant of the drill of FIG. 1 in a perspective view,
FIG. 8 the drill of FIG. 7 in a lateral view,
FIG. 9 a further variant of the drill of FIG. 1 in a perspective view.
Figure 2:
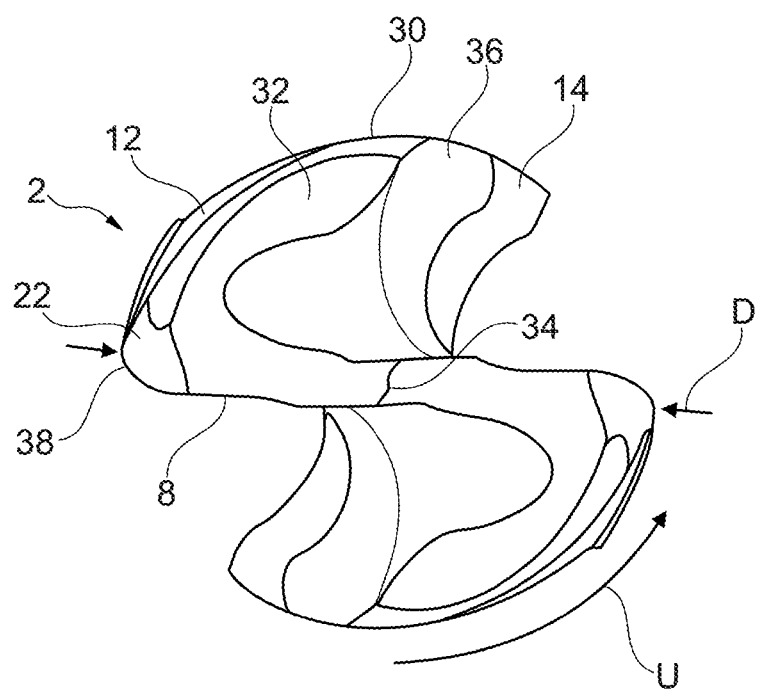
Figure 3:
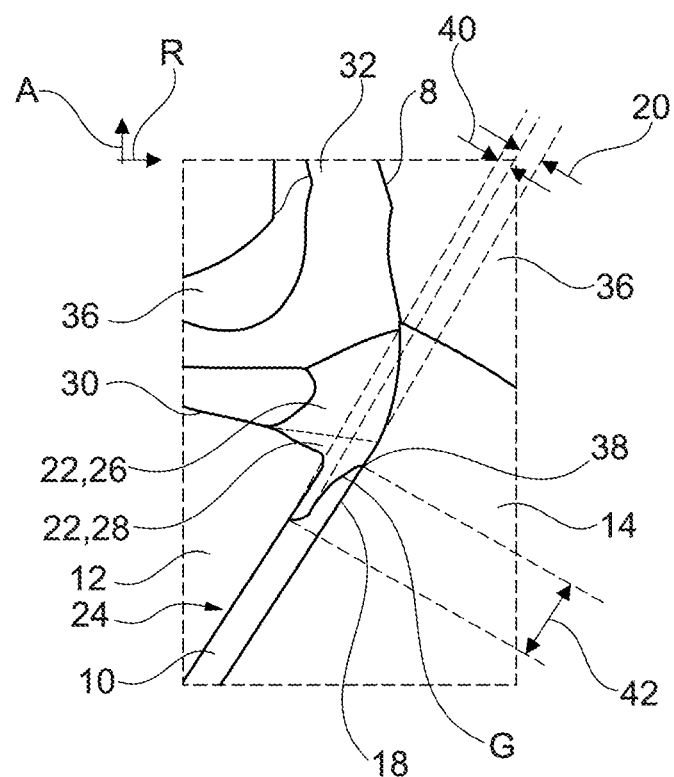
Figure 4:
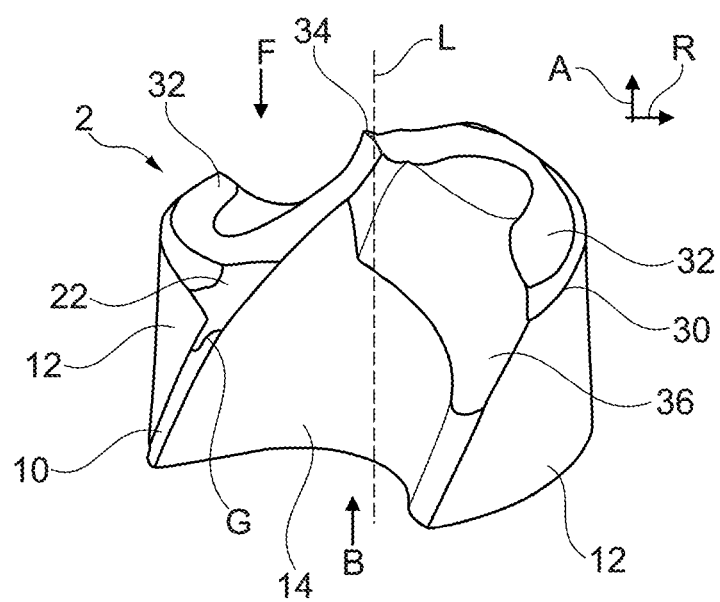
Figure 5:
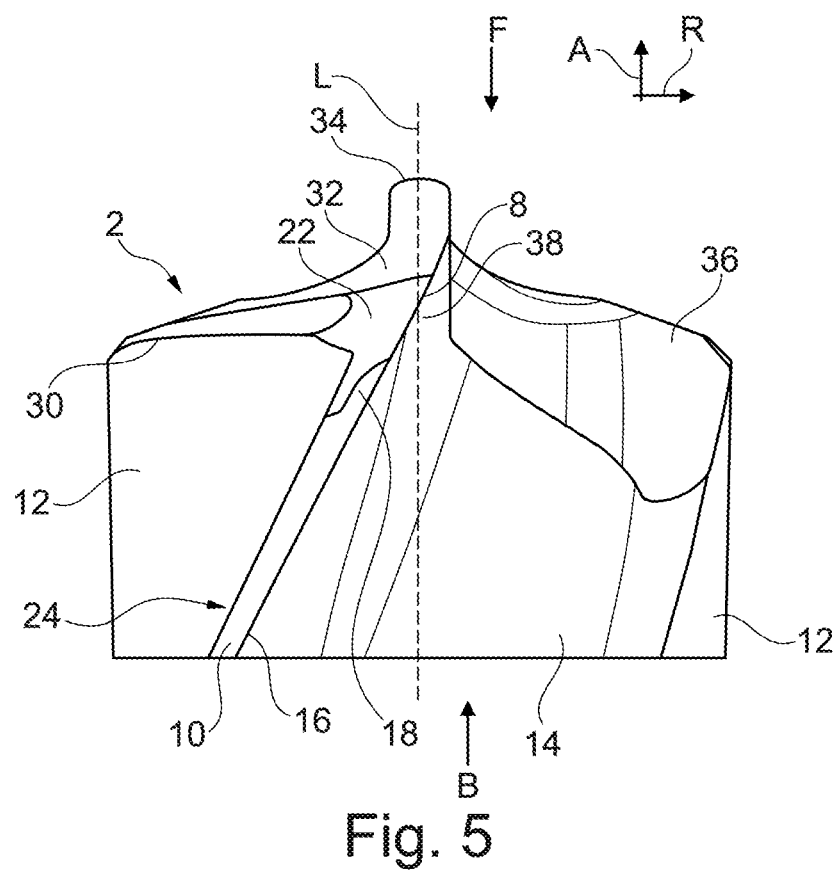
Figure 6:
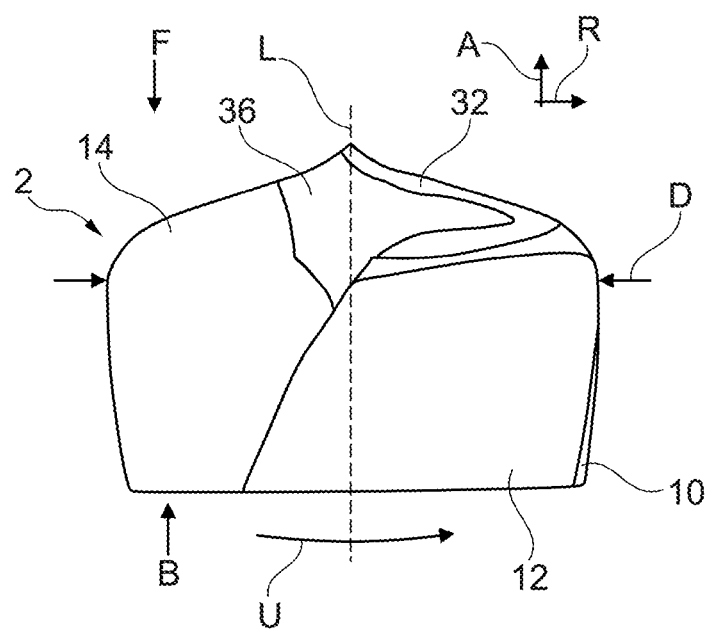

In the design examples shown here, the free surface 22 comprises two partial surfaces 26, 28, namely an axial surface 28 which extends on the side of the body 4 along the end section 18, and a radial surface 26 which extends on the front side F, such that the free surface 22 as a whole is curved, namely from one side of the body 4 toward the front side F. The boundary between the axial surface 28 and the radial surface 26 is indicated in FIGS. 5 and 8 with a dashed line. This results in a further difference between the outer surface 12 and the free surface 22, such that the outer surface 12 extends in axial direction A only up to a circumferential edge 30, thus ending at the tool tip 6, whereas the free surface 22 is inserted into the tool tip 6 from the side of the body 4 and beyond the circumferential edge 30. The two partial surfaces 26, 28 are both configured without edges here and also transition into one another without edges, so that the free surface 22 is a curved surface that is entirely without edges. The tapered end section 18 is formed on the side of the body 4 by the axial surface 28. The radial surface 26, on the other hand, is disposed on the front side F, generally points in axial direction A, and forms a part of the tool tip 6.

In the embodiments shown, the radial surface 26 extends along the main cutting edge 8. The radial surface 26 furthermore follows the main cutting edge 8 in the direction of rotation U, is directly adjacent to said main cutting edge and thus also determines a clearance angle of the main cutting edge 8. In the design examples shown, the free surface 22 is a first free surface that extends inward only along an outer part of the main cutting edge 8 and to the inside adjoins a second free surface 32, which extends along an inner part of the main cutting edge 8 and into the center. The first free surface 22 is also referred to as the outer free surface, whereas the second free surface 32 is referred to as the inner free surface. The transition between the first and the second free surface 22, 32 is continuous here, i.e. there is no edge between the two free surfaces 22, 32, so that the two free surfaces 22, 32 together are also regarded as a single free surface 22. To the inside, the free surface 22 extends to an inner end of the main cutting edge 8. In the present case, the inner end of the main cutting edge 8 adjoins a chisel edge 34, which extends in the center of the drill 2 and is formed by a point thinning 36 that, to the inside, directly adjoins the free surface 22 here.

The main cutting edge 8 and the guide bevel 10, more specifically their end section 18, end together in a cutting corner 38 that is adjoined by the free surface 22 which follows in the direction of rotation U. The cutting corner 38 thus forms a respective end point for the main cutting edge 8 and the secondary cutting edge 16. As a matter of principle, an imaginary boundary line G between the guide bevel 10 and the free surface 22 also ends in the cutting corner 38. Overall, due to the tapered configuration, the guide bevel 10 tapers in the direction toward the cutting corner 38 and ends there. The cutting corner 38 itself is entirely surrounded by the guide bevel 10, the free surface 22, and also by the flute 14.

In the design examples shown, the free surface 22 is configured entirely without edges. A configuration is generally conceivable, in which the outer surface 12 and the radial surface 26 are separated by a circumferential edge 30 that extends in the direction of rotation U around the longitudinal axis L and ends in the cutting corner 38. Due to the specific free surface 22, however, the circumferential edge 30 ends prematurely in the present case and does not reach the cutting corner 38. In fact, the free surface 22 separates the cutting corner 38 from an end of the circumferential edge 30 and lies in between, so that a rounded and edge-free transition from the front side F to the side of the body 4 is realized in the direction of rotation U behind the cutting corner 38. The free surface 22 can thus be prepared in a single pass and in a single process step. Proceeding from a semi-finished product having a circumferential edge 30 that extends to the cutting corner 38, the circumferential edge 30 directly behind the cutting corner 38 is rounded by the free surface 22 and, as a result, the cutting corner is moved toward the rear side B.

As already indicated, the guide bevel 10 has a bevel width 20 which, in the present case, varies due to the tapered end section 18 along the guide bevel 10, i.e. is smaller on the end section 18. In the present case, the bevel width 20 outside the end section 18 corresponds to a normal width and, along the end section 18, the free surface 22 has a width 40 that together with the bevel width 20 of the end section 18 corresponds to the normal width. Taken together, the free surface 22 and the end section 18 are thus just as wide as the rest of the guide bevel 10. The bevel width 20 is also constant here along the guide bevel 10 and outside the end section 18, so that the guide bevel 10 has the normal width throughout, all the way to the end section 18, and the bevel width 20 then deviates from the normal width only along the end section 18. In the design examples shown, the difference to the normal width is filled in by the free surface 22.

In the design examples shown and viewed from the side, the guide bevel 10 is strip-shaped, the end section 18 in itself is strip-shaped as well, and likewise also the free surface 22 along the end section 18. More specifically, in the design examples shown, the free surface 22 and the end section 18 are approximately needle-shaped or funnel-shaped with a tapered section that is followed by a straight section of constant width 20, 40, which is then in turn followed by a further tapered section that ends here in a point. The free surface 22, specifically its axial surface 28, and the end section 18 extend parallel to one another, so to speak, at least along the straight sections, so that the free surface 22 and the guide bevel 10 quasi intertwine when viewed from the side. In other words: an imaginary dividing line between the end section 18 and the free surface 22 extends parallel to the guide bevel 10, i.e. in the direction of said guide bevel. The width 40 of the free surface 22 along the end section 18 is constant or decreasing in the direction toward the rear side B, but not increasing. Conversely, the bevel width 20 along the end section 18 in the direction toward the front side F is likewise constant or decreasing. Overall, therefore, the width 40 of the free surface 22 and the bevel width 20 decrease monotonically toward the respective end.

FIG. 9 shows a variant of the drill 2, in which the end section 18 and the free surface 22 are not parallel but are instead inclined relative to one another, so that an imaginary dividing line between the end section 18 and the free surface 22 is correspondingly inclined.

In the present case, the width 40 of the free surface 22 along the end section 18 is between 20% and 60% of the bevel width 20 of the guide bevel 10 along the end section 18. The width 40 and the bevel width 20 are measured on a respective straight section as described above. The absolute width 40 and the absolute bevel width 20 depend on the specific configuration and dimensioning of the drill 2.

In the design examples shown, the end section 18 is significantly shorter than the entire guide bevel 10 and thus only forms a part of said guide bevel. Specifically, in the present case, the end section 18 has a length 42 that corresponds to 4% to 40% of a diameter D of the drill 2, whereby the length 42 is measured along the guide bevel 10 and the diameter D is a maximum diameter D of the drill 2.

To produce the drill 2, the end section 18 is tapered by grinding the end of the guide bevel 10. In the present case, this is done using a not depicted grinding wheel. In the embodiments shown, the end section 18 was tapered by grinding off a part of the guide bevel 10 by grinding in a free surface 22, which extends continuously from the front side F of the body 4 to a side of the body 4. Proceeding from a semi-finished product having a guide bevel 10 with a continuously constant bevel width 20, the end of the guide bevel 10 is partially removed and, as a result, the free surface 22 is formed.

The invention claimed is:

1. A drill, comprising:
a body extending along a longitudinal axis (L) from a rear side (B) to a front side (F),
wherein the body comprises a main cutting edge on the front side (F),
wherein the body comprises a guide bevel, which extends in an axial direction (A) toward the front side (F) along a secondary cutting edge,
wherein, toward the front side (F), the guide bevel has an end section which is tapered as a result of a first free surface directly adjacent the guide bevel in the axial direction (A), wherein the drill has a smaller diameter (D) on the first free surface than on the guide bevel, and
wherein the body comprises a second free surface extending from the first free surface radially inward along the main cutting edge to a chisel edge,
wherein the body further comprises a cutting corner forming an end point for the main cutting edge and the secondary cutting edge,
wherein the first free surface comprises two partial surfaces, namely an axial surface, which extends on a side of the body along the end section, and a radial surface, which extends on the front side (F) such that the first free surface as a whole is curved,
wherein the radial surface extends along the main cutting edge and follows the main cutting edge in a direction of rotation (U), and
wherein the axial surface of the first free surface has a width that is constant such that an imaginary boundary line (G) between the guide bevel and the first free surface extends parallel to the guide bevel.

2. The drill according to claim 1, wherein the first free surface follows the end section in a direction of rotation (U).

3. The drill according to claim 1, wherein the transition of the first free surface into the guide bevel is without steps.

4. The drill according to claim 1, wherein the first free surface is configured entirely without edges.

5. The drill according to claim 1, wherein the guide bevel has a bevel width which, outside the end section, corresponds to a normal width, and wherein, along the end section, the first free surface has a width that together with a bevel width of the end section corresponds to the normal width.

6. The drill according to claim 1, wherein, along the end section, the first free surface has a width that is between 20% and 60% of a bevel width of the guide bevel along the end section.

7. The drill according to claim 1, wherein the end section has a length which corresponds to 4% to 40% of a diameter (D) of the drill.

\* \* \* \* \*